(No Model.)  2 Sheets—Sheet 1.
P. C. HEWITT.
APPARATUS FOR AERATING LIQUIDS.
No. 581,206. Patented Apr. 20, 1897.
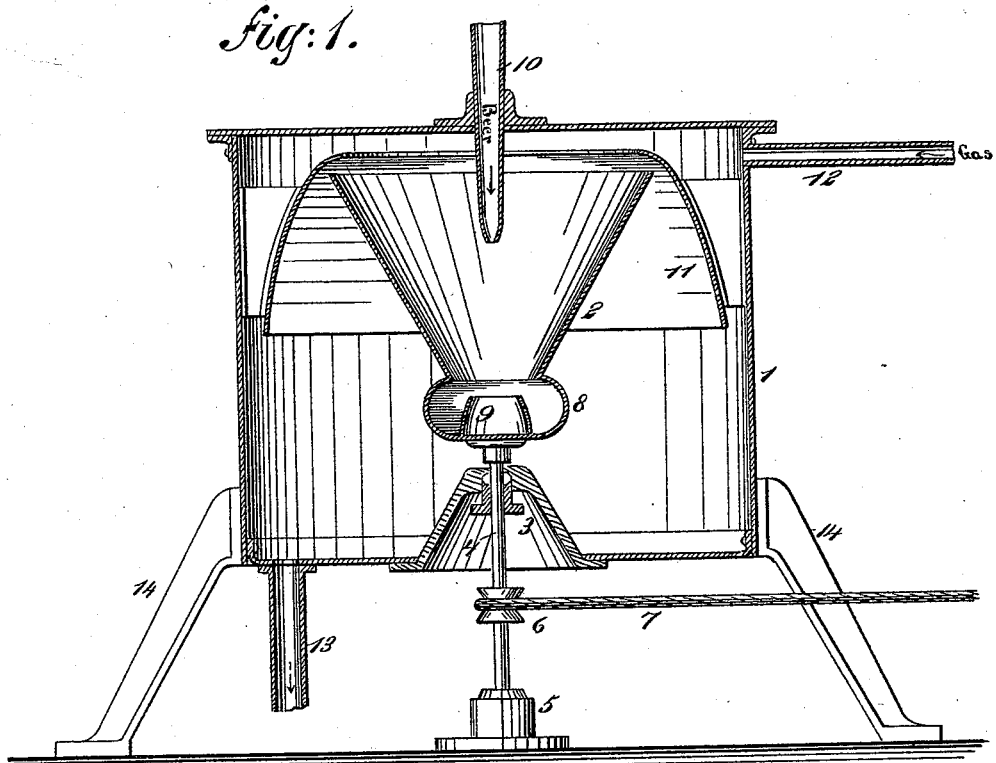
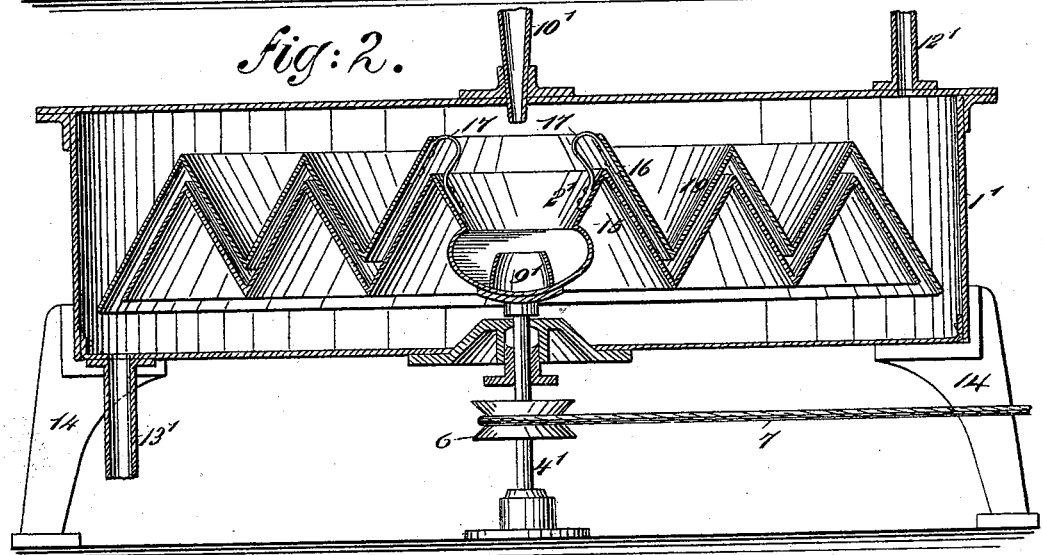
WITNESSES:
Chas. Nider.
G. M. Hopkins.
INVENTOR
P. C. Hewitt
BY Munn & Co.
ATTORNEYS.
THE NORRIS PETERS CO., PHOTO-LITHO., WASHINGTON, D. C.

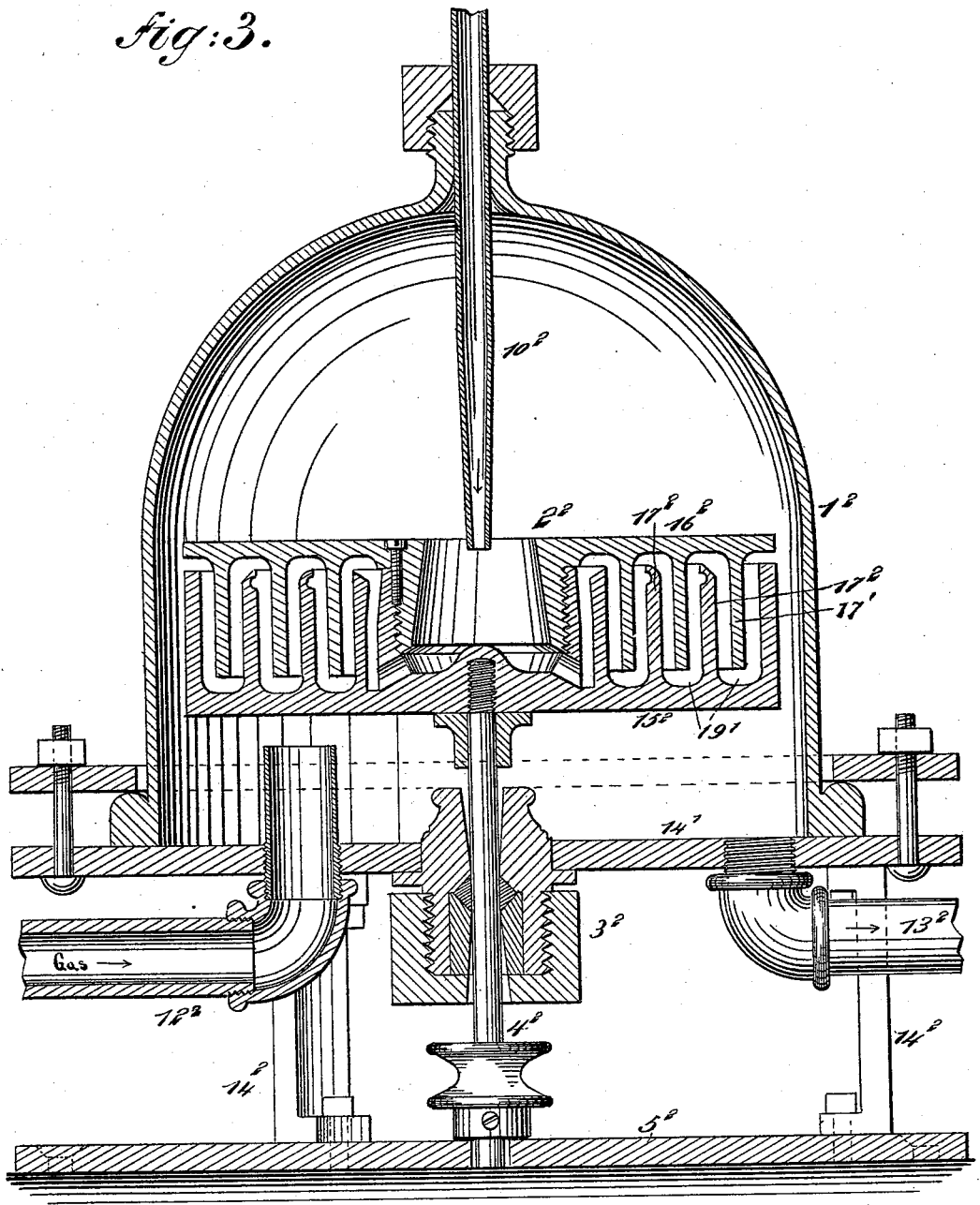

UNITED STATES PATENT OFFICE.

PETER COOPER HEWITT, OF NEW YORK, N. Y.

APPARATUS FOR AERATING LIQUIDS.

SPECIFICATION forming part of Letters Patent No. 581,206, dated April 20, 1897.

Application filed January 23, 1895. Serial No. 535,850. (No model.)

*To all whom it may concern:*

Be it known that I, PETER COOPER HEWITT, of New York city, in the county and State of New York, have invented a new and Improved Apparatus for Aerating Liquids, of which the following is a full, clear, and exact description.

My invention is applicable to aerating waters, beer, and other liquids.

In the manufacture of beer by some methods the carbonic acid in the beer is extracted and it becomes necessary to replace the gas thus taken out.

The object of my invention is to thoroughly aerate the beer while it is in the form of a highly-attenuated film.

My invention consists in a centrifugal machine of peculiar construction adapted to reduce the liquid to the form of an extremely thin film, the centrifugal machine being operated in a closed vessel suitable for the required pressure.

Reference is to be had to the accompanying drawings, forming a part of this specification, in which similar figures of reference indicate corresponding parts in all the views.

Figure 1 is a side sectional elevation of my improved film-aerator. Fig. 2 is a side sectional elevation of a modified form, and Fig. 3 is a vertical transverse section of a modification of the machine shown in Fig. 2.

The closed vessel 1, which contains the bowl 2 of the centrifugal machine, is provided at the bottom thereof with a combined stuffing-box and journal-box 3, through which passes the upper end of the shaft 4, the lower end of which is journaled in the step 5, arranged below the bottom of the closed vessel. The shaft 4 is provided with a pulley 6 for receiving the belt 7, by which the machine is driven.

The bowl 2, carried by the shaft 4, is provided with a lower portion 8, which is of spheroidal form, and in the center of which is placed the starting-cup 9 for receiving the beer introduced into the machine through the nozzle 10, inserted in the top of the vessel 1. The bowl 2, which is formed integrally with or attached to the spheroidal portion 8, is in the form of a funnel or inverted hollow cone.

In the vessel 1 is supported a hood 11, the circular wall of which is developed on a cycloidal curve. The said hood extends from a point above and inside of the rim of the bowl 2 outwardly and downwardly. In the upper portion of the containing vessel 1 is inserted a gas-supply tube 12, and with the bottom of the containing vessel 1 is connected a beer-discharge pipe 13.

For convenience in operation the containing vessel 1 is supported upon legs 14. The shaft 4 being in rapid motion the bowl 2 is rotated with sufficient velocity to discharge the beer from the starter 9, so that it will be received upon the conical walls of the bowl and be spread out upon the walls in an extremely thin film, the tenuity of which increases as the beer approaches the top of the bowl. The beer and the gas are both under pressure, and the discharge-pipe 13 is controlled by a suitable valve, so that a certain volume of beer remains in the bottom of the vessel 1. The pressure which the gas is to retain after the beer is bottled or barreled is maintained in the receiving vessel 1, and the beer is thus made to receive the gas under that pressure, which is generally about fifteen pounds to the square inch.

In the modification shown in Fig. 2 the receiving vessel 1' is arranged in practically the same way as that already described, and the shaft 4' carries a bowl 2', containing a receiving-cup 9', as described in the case of Fig. 1, but the bowl 2' is made shallower, and with its upper edge is connected a corrugated disk 15, which lies in a horizontal plane, and a corrugated disk 16 of a corresponding form is supported above and about parallel with the disk 15 by straps 17, attached to the disk and to the bowl, leaving a thin space between the two disks. The corrugations of the disk may be made V-shaped, as shown.

In the top of the containing vessel 1' is inserted a nozzle 10' for the introduction of beer, a pipe 12' for the introduction of carbonic gas, and a discharge-pipe 13' for conveying away the beer. When the shaft 4' is rotating rapidly and beer is introduced into the receptacle 1' through the nozzle 10', the beer is thrown upwardly on the inner surface of the bowl 2' by centrifugal force and discharged against the first inclined surface of the disk 16. Following this surface the beer descends to the lower part of the first V-shaped circular groove and is thrown off by centrifugal force through the gas contained by the space between the disks and is received by the next conical surface of the disk 15, which carries it up and delivers it in the manner described to the second downwardly-inclined surface of the disk 16, and so on until it reaches the last of the inclined surfaces of the corrugated disk 16, down which the beer flows and from which it is discharged against the wall of the vessel 1', when it finds its level by its own gravity. The beer is thus reduced to a very thin film on the rotating surfaces, and at the same time the carbonic acid contained by the receiving vessel is carried between the rotating disks by centrifugal force and is brought thoroughly into contact with the beer-film, so that the beer is thoroughly impregnated with carbonic acid.

In the modification shown in Fig. 3 the shaft $4^2$ is journaled at its lower end in the bed-plate $5^2$ and extends upward through a gland $3^2$, inserted in the plate 14', supported by standards $14^2$, attached to the bed-plate $5^2$. The shaft $4^2$ revolves in the packing contained by the gland and is prevented from touching the metal portions of the gland by the flaring or tapering of the hole through the gland on either side of the packing, and the bearing of the lower end of the shaft is loose in the bed-plate $5^2$.

To the upper end of the shaft $4^2$ is secured the centrifugal bowl $2^2$, which is made of two parts $15^2$ $16^2$, formed with collars 17' $17^2$, leaving intermediate annular channels 19' $19^2$. The upper portion $16^2$ of the centrifugal bowl is screwed into the lower portion and is provided with a central aperture forming, in connection with the lower portion, a bowl which receives the beer or other liquid, and the collars 17' of the upper portion of the bowl project downward into the annular spaces 19' between the collars $17^2$. The wall of the central aperture of the upper part $16^2$ is inclined so that the lower portion of the opening is larger in diameter than the upper portion of the opening. In the lower part of the bowl the central opening is enlarged, and apertures lead outwardly to the spaces between the collars 17' $17^2$, so that liquid discharged into the central opening by the pipe $10^2$ of the bowl is thrown outwardly into the spaces between the collars and is reduced by centrifugal force to a thin film on the collars and overflows alternately from the upper and lower collars, finally being discharged at the periphery of the bowl against the wall of the casing $1^2$. The liquid in its passage through the spaces between the collars passes through the gas, which is also carried through the spaces by centrifugal force.

By interposing one or more barriers in the path of the liquid thrown outwardly by centrifugal force in the manner described the liquid is made to exert a pressure against the barrier in proportion to the amount of centrifugal force exerted on the liquid, so that the liquid spreads itself over the surface of the barrier. The amount of pressure exerted by the liquid on the barrier depends on the angle formed by the barrier with the plane of rotation and the centrifugal force. The more nearly the angle of the barrier approaches ninety degrees the greater will be the pressure exerted by the liquid against the barrier, and consequently the thinner will be the film of liquid formed.

The casing $1^2$ is clamped to the bed-plate 14' and the pipe $10^2$ enters the casing through a gland. The gas-supply pipe $12^2$ enters the casing $1^2$ through the plate 14' and extends upwardly through the body of beer contained by the casing, and the discharge-pipe $13^2$ is inserted in the plate 14' near the wall of the casing $1^2$. A portion of the first collar of the series in the lower part of the bowl is inclined toward the center of the bowl. In the second and third collars are formed semicircular grooves near the upper edges thereof, and the outer surface of the collar at the upper edge is cut away, forming a beveled or rounded surface, as shown.

To secure a complete aeration of the liquid where it is found necessary to carry on the operation of aeration under a pressure considerably in excess of that at which the liquid is to remain after the process is completed, the liquid is carried to a storage-reservoir through a pressure-reducer, which allows the gas to expand in the reservoir, whence it is taken back to be used again in aeration, while the liquid is retained in the storage-reservoir at the required reduced pressure.

Having thus described my invention, I claim as new and desire to secure by Letters Patent—

1. In an apparatus for aerating liquids, a centrifugal film-former provided with a series of surfaces increasing in area from the center of motion outwardly, and arranged at an angle with the plane of rotation, forming barriers for causing the spread of the liquid, a feed device for delivering the liquid to the inner side of the innermost surface, a gas-tight chamber inclosing the film-former, and means for supplying gas to said chamber, substantially as specified.

2. In an apparatus for aerating liquids, a centrifugal bowl acting as a film-former provided with a series of surfaces arranged at an angle with the plane of rotation, means for feeding the liquid from the center of the bowl outwardly to the inner side of said surfaces, a gas-tight chamber inclosing the centrifugal film-former and means for supplying gas to said chamber, substantially as specified.

3. In combination with a gas-tight chamber and means for supplying gas thereto, a centrifugal film-former inclosed within said chamber and comprising a series of surfaces surrounding one another and arranged to discharge the liquid from one to the other of the series, and a starting-cup located at the center of the series and having its bottom in approximately the same plane with the bottoms of said surfaces, substantially as described.

4. In combination with a gas-tight chamber, and means for supplying gas thereto, a centrifugal film-former inclosed within said chamber and comprising a series of surfaces surrounding one another and arranged to discharge the liquid from one to the other of the series, and a starting-cup located at the center of the series and arranged to discharge the liquid on the innermost surface, substantially as described.

PETER COOPER HEWITT.

Witnesses:
C. SEDGWICK,
GEO. M. HOPKINS.